(12) United States Patent
Halling

(10) Patent No.: US 7,789,397 B2
(45) Date of Patent: *Sep. 7, 2010

(54) METALLIC SEAL

(75) Inventor: Horace P. Halling, Durham, CT (US)

(73) Assignee: American Seal and Engineering Company, Inc., Orange, CT (US)

( * ) Notice: Subject to any disclaimer, the term of this patent is extended or adjusted under 35 U.S.C. 154(b) by 403 days.

This patent is subject to a terminal disclaimer.

(21) Appl. No.: 11/784,716

(22) Filed: Apr. 9, 2007

(65) Prior Publication Data

US 2007/0235948 A1 Oct. 11, 2007

Related U.S. Application Data

(63) Continuation-in-part of application No. 11/261,162, filed on Oct. 27, 2005, now Pat. No. 7,201,381, which is a continuation of application No. 10/629,501, filed on Jul. 29, 2003, now Pat. No. 6,983,940.

(51) Int. Cl.
*F16J 15/02* (2006.01)
(52) U.S. Cl. .................. 277/604; 277/614; 277/617; 277/644; 277/647
(58) Field of Classification Search ............. 277/644, 277/647, 648, 567, 497, 530
See application file for complete search history.

(56) References Cited

U.S. PATENT DOCUMENTS 3,192,690 A * 7/1965 Taylor ................ 220/378
4,125,929 A * 11/1978 Rode .................... 29/446
4,336,943 A * 6/1982 Chaplin ................ 277/643
4,457,523 A * 7/1984 Halling et al. ........ 277/644
4,744,572 A * 5/1988 Sahba et al. .......... 277/641
4,784,397 A * 11/1988 Tozer .................... 277/644
5,799,954 A * 9/1998 Layer ................... 277/614
6,257,594 B1 * 7/2001 Halling et al. ........ 277/644

* cited by examiner

*Primary Examiner*—Vishal Patel
(74) *Attorney, Agent, or Firm*—Raymond Nuzzo

(57) ABSTRACT

An annular, axial seal having a linear section having opposite ends, a first side in a first plane and an opposite second side in a second plane wherein the second plane is parallel to the first plane and a curled section contiguous with one of the ends of the linear section. The curled section curls in a first direction to a distal end. The curled section curls in the first direction in accordance with a predetermined radius and predetermined distance such that the distal end of the curled section is located directly across from the first side of the linear section. The linear section and the curled section provide a generally "J" shaped cross-section. The annular, axial seal also has a tip portion contiguous with the opposite end of the linear section such that the linear section is between the tip portion and the curled section. The tip portion is slightly curved with respect to the linear section such that the tip portion breaks the first plane. The tip portion has an end that does not directly face the distal end of the curled section.

1 Claim, 14 Drawing Sheets

METALLIC SEAL

CROSS-REFERENCE TO RELATED APPLICATIONS

The application is a continuation-in-part of prior application Ser. No. 11/261,162, filed Oct. 27, 2005, now U.S. Pat. No. 7,201,381 which is a continuation of prior application Ser. No. 10/629,501, filed Jul. 29, 2003, now U.S. Pat. No. 6,983,940. The entire disclosures of the aforesaid application Ser. Nos. 10/629,501 and 11/261,162 are hereby incorporated by reference.

BACKGROUND OF THE INVENTION

The present invention relates to a metallic seal for the containment of high pressure fluids, including gases, from cryogenic to highly elevated temperatures. More particularly, the present invention relates to pressure-energized, annular metallic lip seals with lateral offset, angular and axial misalignment capability.

In the field of fluid containment of high pressure fluids, resilient metallic seals are employed in applications where elastomeric and polymeric materials cannot be used because of extremely high pressures, high temperatures and/or aggressive media. Such sealing devices are produced in different configurations designed to meet a variety of operating requirements.

One such seal is the "Axial C-Seal", shown in FIGS. 1A and 1B, which was developed as an improvement in flexibility over the hollow metal o-ring. Like the metal o-ring, the axial c-seal may be used to seal gaps between cylindrical surfaces, in mainly static applications.

Other seals have been developed to perform this function, for example, those shown in the following U.S. Pat. Nos. 4,457,523; 4,854,600; 5,799,954; 6,257,594; and 6,446,978. All of these seals serve their purpose, but have limitations when required to be both pressure-energized and capable of accommodating significant misalignments of the cylindrical surfaces to be sealed.

In devices known as couplings, a rigid hollow proboscis or probe is inserted into a hollow receptacle in a fluid transmission system. The receptacle contains a sealing ring or multiple sealing rings, which are dilated by the inserted probe, thereby creating the required contact stresses to achieve fluid containment between the two bodies to be sealed together.

C-seals are presently employed in couplings. Occasionally, due to imperfect field installation practices, the probe will be forced into the receptacle before the centerlines or axes of the two components are properly aligned. When this occurs, the probe may dent one side of the c-seal, which may not be sufficiently resilient to elastically deform, and therefore may leave a gap on the opposite side which results in leakage of fluid when the joint is pressurized.

It is highly desirable to provide an improved metallic seal which overcomes the foregoing problems.

SUMMARY OF THE INVENTION

In accordance with the present invention it has now been found that a metallic seal has been provided which obtains the foregoing objectives.

The metallic seal of the present invention has a C-shaped portion which connects to a longitudinally extending portion. The c-shaped portion desirably has a discrete radius with a smaller radius than the axial c-seal, to prevent contact between the probe and this relatively rigid area during installation. The inside diameter of the c-shaped portion is desirably extended axially towards the end of the c-shaped portion and towards a first end of the seal, and slightly inwardly, desirably terminating in a small inwardly curled portion forming a lip. The opposed portion of the c-shaped portion connects to a longitudinally extending portion which extends above or beyond the c-shaped portion and which desirably terminates in a small outwardly curved portion. The overall configuration of the seal is somewhat L-shaped, or J-shaped.

In a related aspect, the present invention is directed to an annular seal member having a generally "j" shaped cross-section and comprising a first end portion having a first distal end, a generally curled second end portion that extends to a second distal end, and a central body portion between and contiguous with the first and second end portions. The annular seal member has a first side and an opposite second side. The second end portion curls in a first direction in accordance with a predetermined radius such that the second distal end is located across from the first side of the seal member and the first and second distal ends do not face each other.

In another aspect, the present invention is directed to an annular seal member comprising a first side and an opposite second side, a generally frustoconical central body portion having opposite ends, a first end portion contiguous with one of the opposite ends of the generally frustro-conical central body portion, and a generally curled second end portion contiguous with the other of the opposite ends of the generally frustro-conical central body portion. The first end portion has a first distal end. The second end portion extends to a second distal end. The second end portion curls in a first direction in accordance with a predetermined radius such that the second distal end is located across from the first side of the annular seal member and the first and second distal ends do not face each other.

In a further aspect, the present invention is directed to an annular seal member having a generally hook shaped cross-section, a first side and a second opposite side. The annular seal member comprises a first end portion having a first distal end, a generally curled second end portion that extends to a second distal end, and a central body portion between and contiguous with the first and second end portions. The second portion curls in a first direction in accordance with a predetermined radius such that the second distal end is located across from the first side of the annular seal member and the first and second distal ends do not face each other.

In another aspect, the present invention is directed to an annular metallic seal comprising a first side and an opposite second side, a generally frustro-conical central body portion having opposite ends, a first end portion contiguous with one of the opposite ends of the generally frustro-conical central body portion, and a curled second end portion contiguous with the other of the opposite ends of the generally frustro-conical central body portion. The first end portion has a first distal end. The second end portion extends to a second distal end. The generally frustro-conical central body has a thickness that tapers in the direction of the first distal end. The first distal end is slightly angulated in a first direction. The second end portion curls in the first direction in accordance with a predetermined radius such that the second distal end is located across from the first side of the annular metallic seal and the first and second distal ends do not face each other.

In a related aspect, the present invention is directed to an annular axial seal comprising:

a) a linear section consisting of opposite ends, a first side in a first plane and an opposite second side in a second plane wherein the second plane is parallel to the first plane;

b) a curled section contiguous with one of the ends of the linear section wherein the curled section curls in a first direction to a distal end and wherein the curled section curls in the first direction in accordance with a predetermined radius and predetermined distance such that the distal end of the curled section is located directly across from the first side of the linear section;

c) wherein the linear section and the curled section provide a substantially "J" shaped cross-section;

d) a tip portion contiguous with the opposite end of the linear section such that the linear section is between the tip portion and the curled section; and e) wherein the tip portion is slightly curved with respect to the linear section such that the tip portion breaks the first plane, and wherein the tip portion has an end that does not directly face the distal end of the curled section.

Further features and advantages of the present invention will appear herein below.

BRIEF DESCRIPTION OF THE DRAWINGS

The present invention will be more readily understandable from a consideration of the accompanying drawings, wherein.

DETAILED DESCRIPTION OF PREFERRED EMBODIMENTS

Figure 1A:
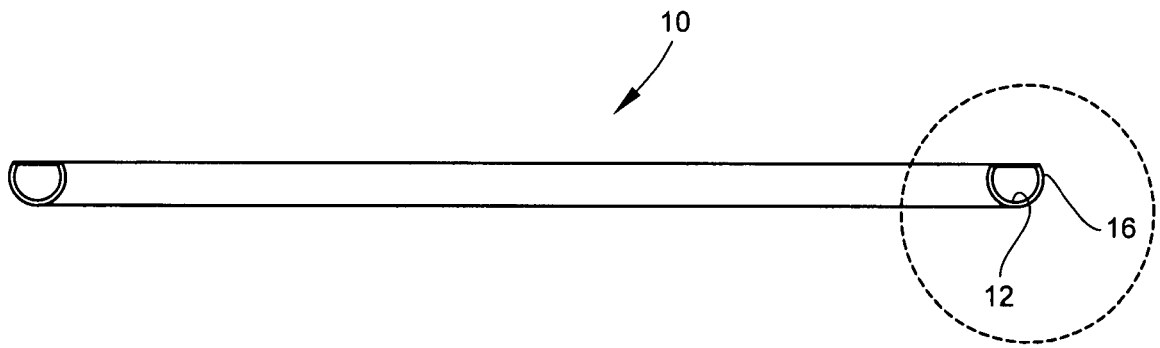
FIG. 1A is a side view, in longitudinal section, of a prior art axial c-seal.
Figure 1B:
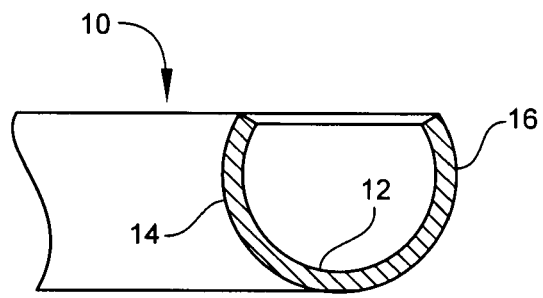
FIG. 1B is a enlarged view of a portion of the view shown in FIG. 1A.

Referring now to the drawings in detail, FIGS. 1A and 1B show views of a prior art axial c-seal 10, showing an arcuate portion 12, outer sealing line 14 and inner sealing line 16.

Referring to FIGS. 2A-2G, there are shown various views of the seal 20 of the present invention. Seal 20 comprises an arcuate portion 22, outer sealing line 24 and inner sealing line 26. Seal 20 includes an inward curl 28 at one end of the arcuate portion which forms a return 29 at a first edge 30 of seal 20, and the opposed end of the arcuate portion connects to an inwardly tapering frustro-conical portion or longitudinally extended portion 32 which terminates in an outward curved portion 34 to the second opposed edge 36 of seal 20. The function of the return 29 is to provide stiffening and a lead-in which facilitates assembly for the smooth insertion of the seal into an external cavity during installation.

Figure 2A:
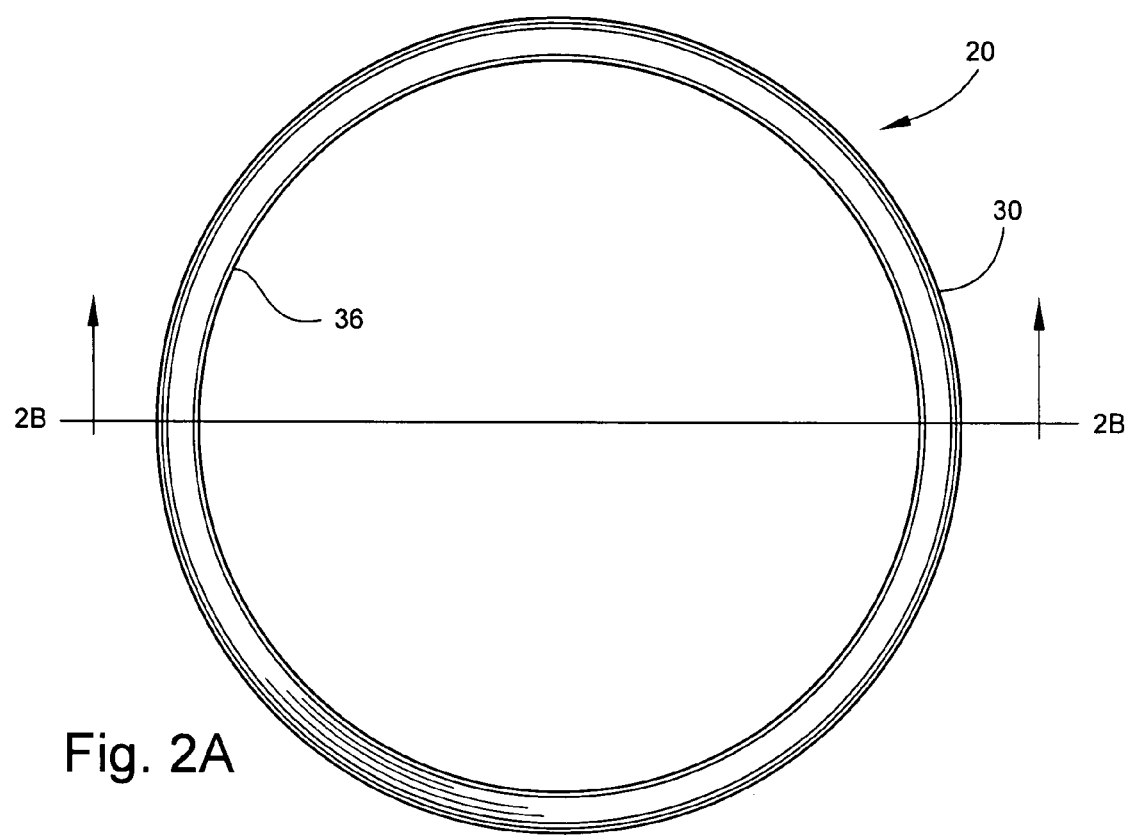
FIG. 2A is plan view of the annular seal member of the present invention.
Figure 2B:
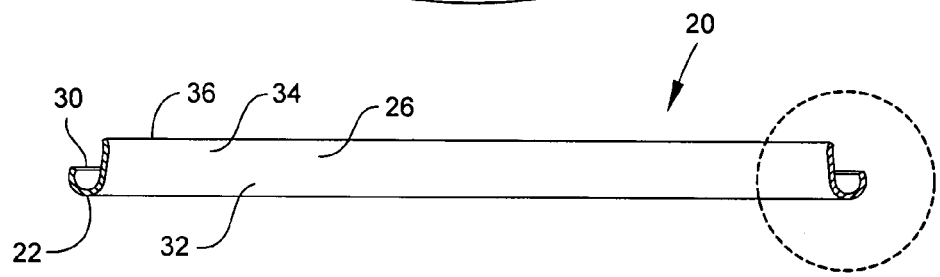
FIG. 2B is a side view, in longitudinal section, taken along line 2B-2B in FIG. 2A.
Figure 2C:
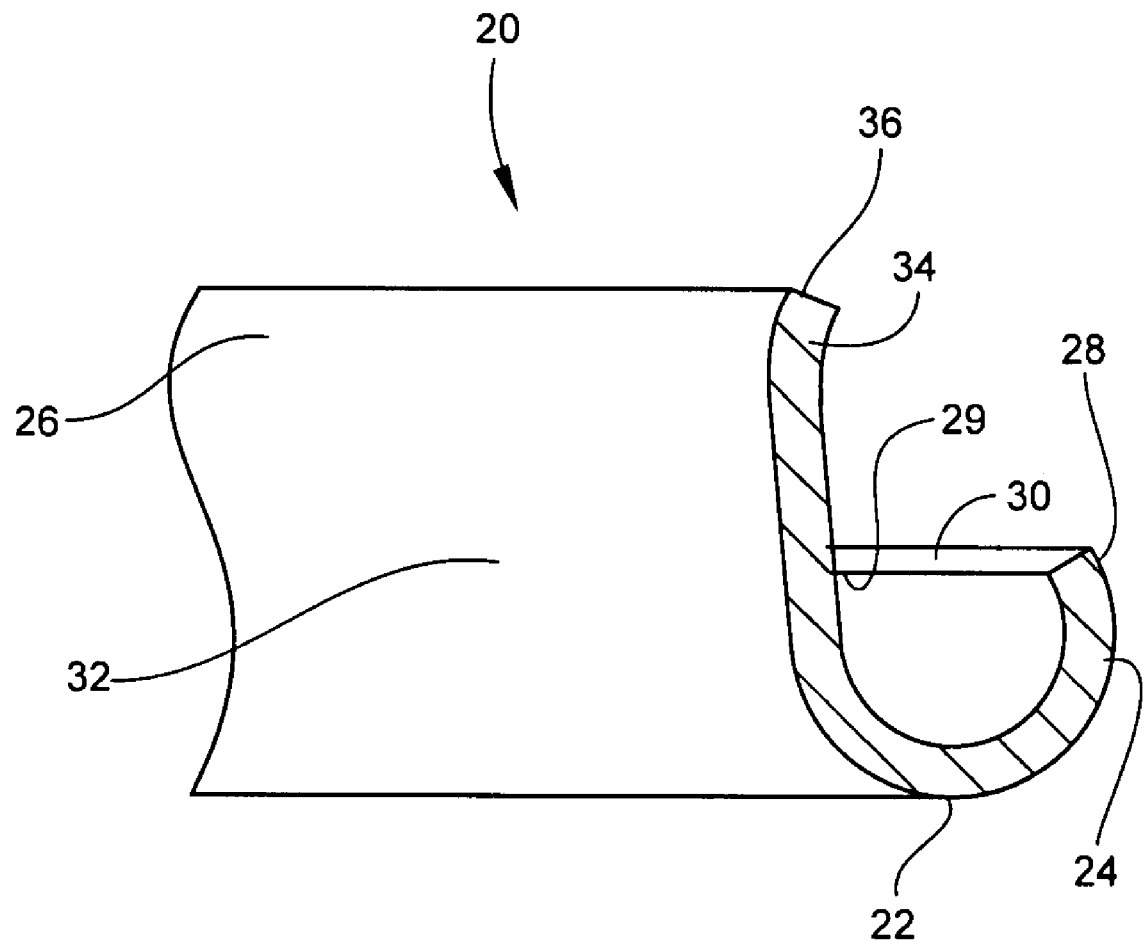
FIG. 2C is an enlarged view of the portion of the view shown in FIG. 2B.

FIG. 2C is an enlarged view of the portion of the view of FIG. 2B indicated by the dashed circle. Similarly, FIG. 2G is an enlarged view of the portion of the view of FIG. 2F indicated by the dashed circle.

Figure 3:
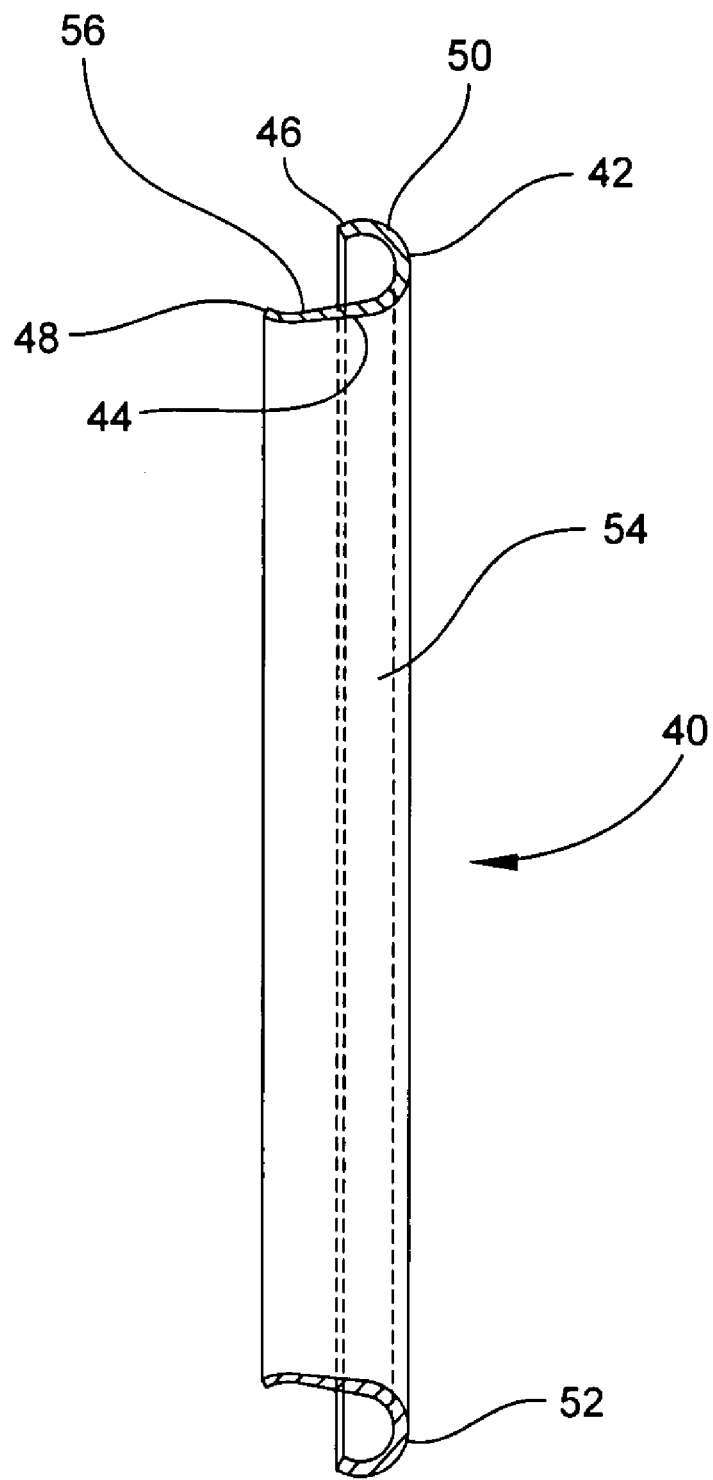
FIG. 3 is a side view, in longitudinal section, of the seal of the present invention.

FIG. 3 shows a side view of a further embodiment of the present invention. Seal 40 comprises arcuate portion 42, an inwardly tapered frustro-conical portion 44, inward curl 46 and outward curl 48. A first portion 50 is connected to a second portion 52 of seal 40 by longitudinally extending body portion 54, which depicts a preferred longitudinally extending body of the seals of the present invention. Seal 40 further includes a material taper 56 at the frustro-conical portion 44 wherein the thickness of the material forming seal 40 decreases to increase flexibility of seal 40.

The preferred materials for the seals of the present invention include nickel super alloys and nickel cobalt alloys, although other metals may be used.

The seal of the present invention has several significant advantages. One advantage is that the flexibility of the inward facing lip 29 is enhanced by increased distance from the more rigid c-shaped part of the section and it can be deflected radially by a lower force.

Another advantage is that the configuration of the frustro-conical portion 44 may be reshaped by deflecting relatively easily to accommodate an off-center probe without plastic deformation of this region.

A further advantage is that the seal of the present invention may be manufactured from a relatively thicker material stock in comparison to the prior art axial-c-seal without an appreciable increase in insertion force or galling tendencies.

Another advantage is that when the seal of the present invention is manufactured from relatively thicker material, in comparison to the prior art axial c-seal, the greater material thickness and a close proximity between the installed probe and the deflected inner frustro-conical leg of the ring cross-section allow for higher operating and proof pressures to be sustained without gross permanent deformation.

A further advantage of the seal of the present invention is enhanced reliability. Multiple insertions of the probe into prior art seals have been a problem for prior art seals.

Another advantage of the seal of the present invention results from the tapered cross-section of the frustro-conical portion. This flexible feature is advantageous for dynamic, sliding application, albeit at slow speeds, because of reduction of contact stresses.

Figure 4:
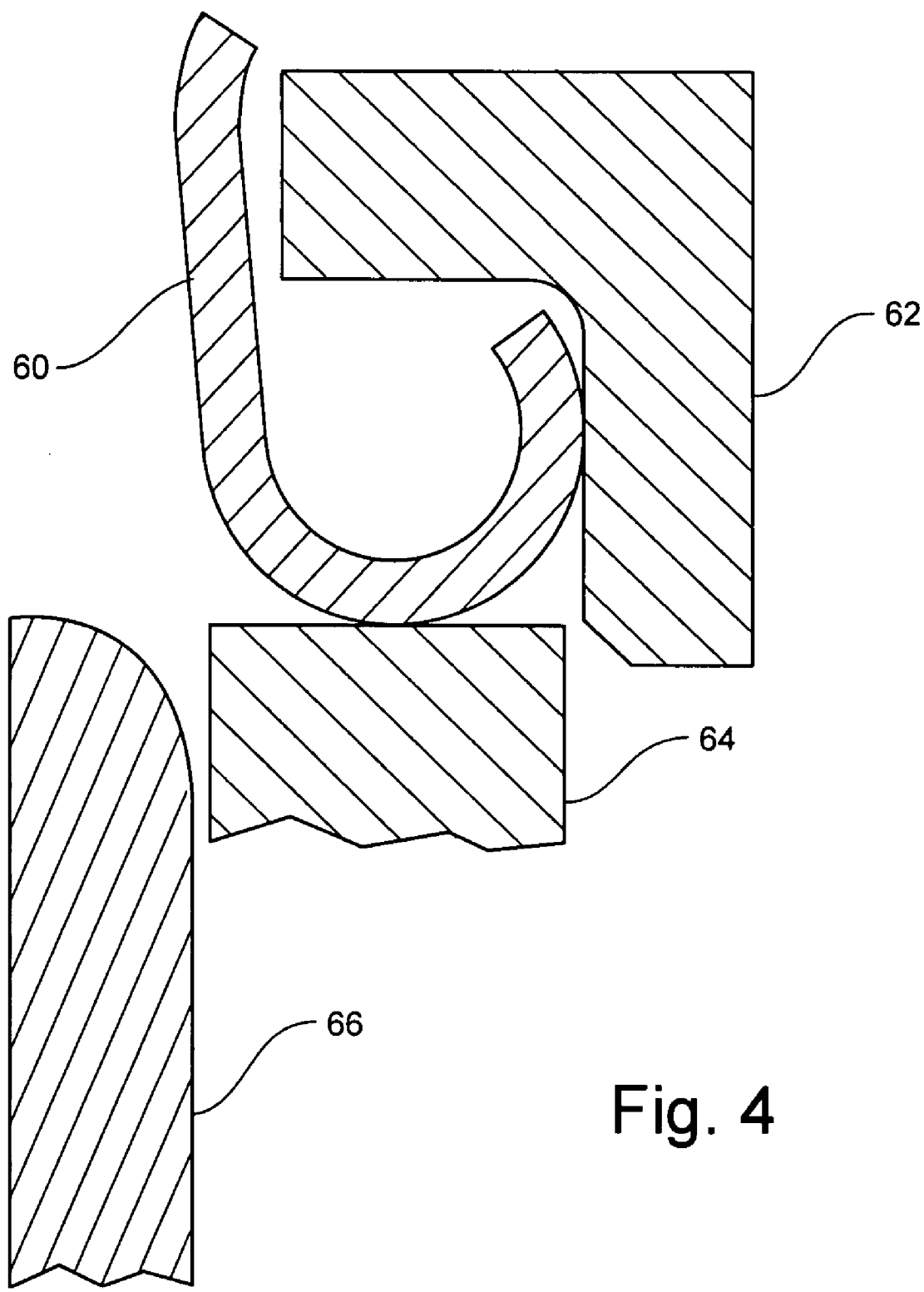
FIG. 4 is a schematic cross-sectional view of the installation of the seal of the present invention.
Figure 5:
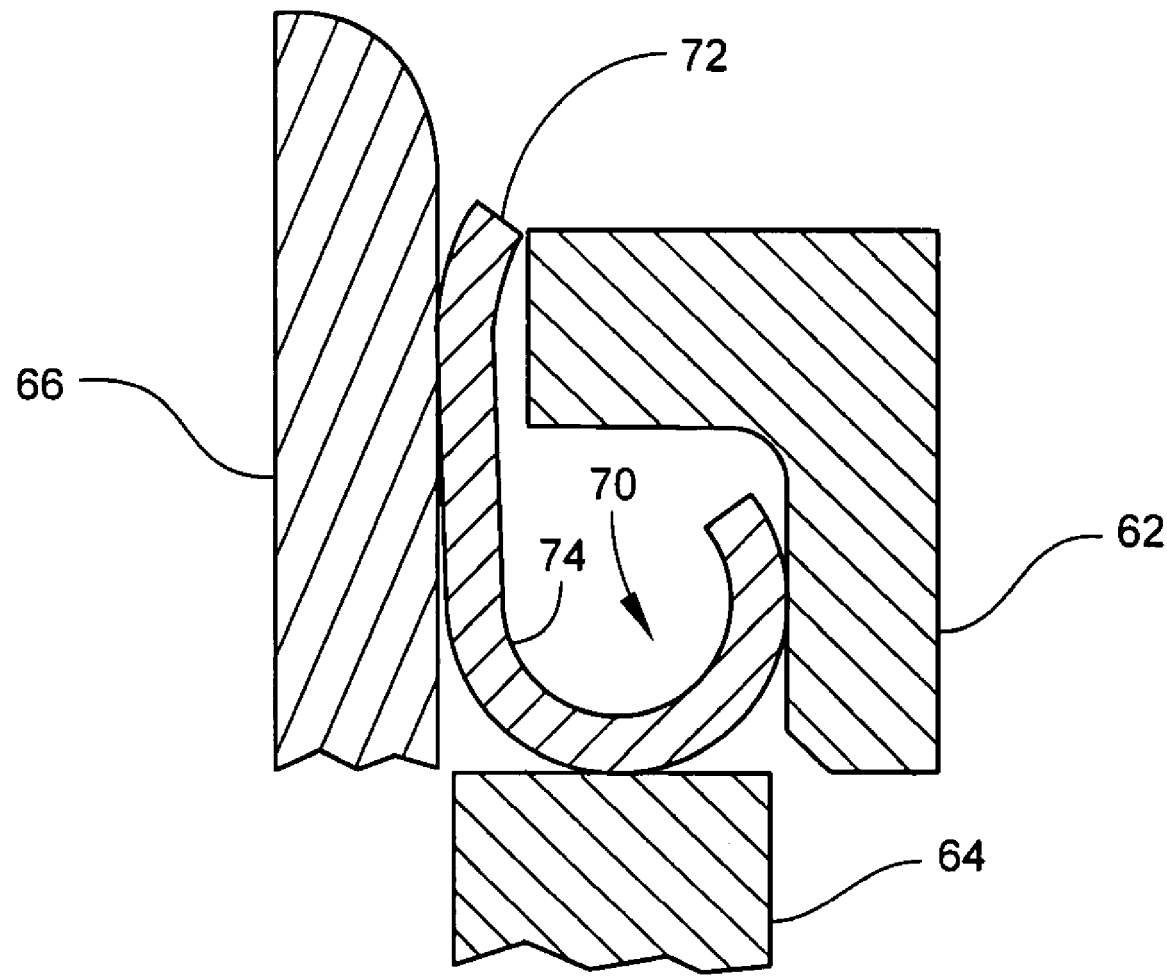
FIG. 5 is a schematic cross-sectional view of a seal of the present invention installed, with an axis of a probe displaced to the right.
Figure 6:
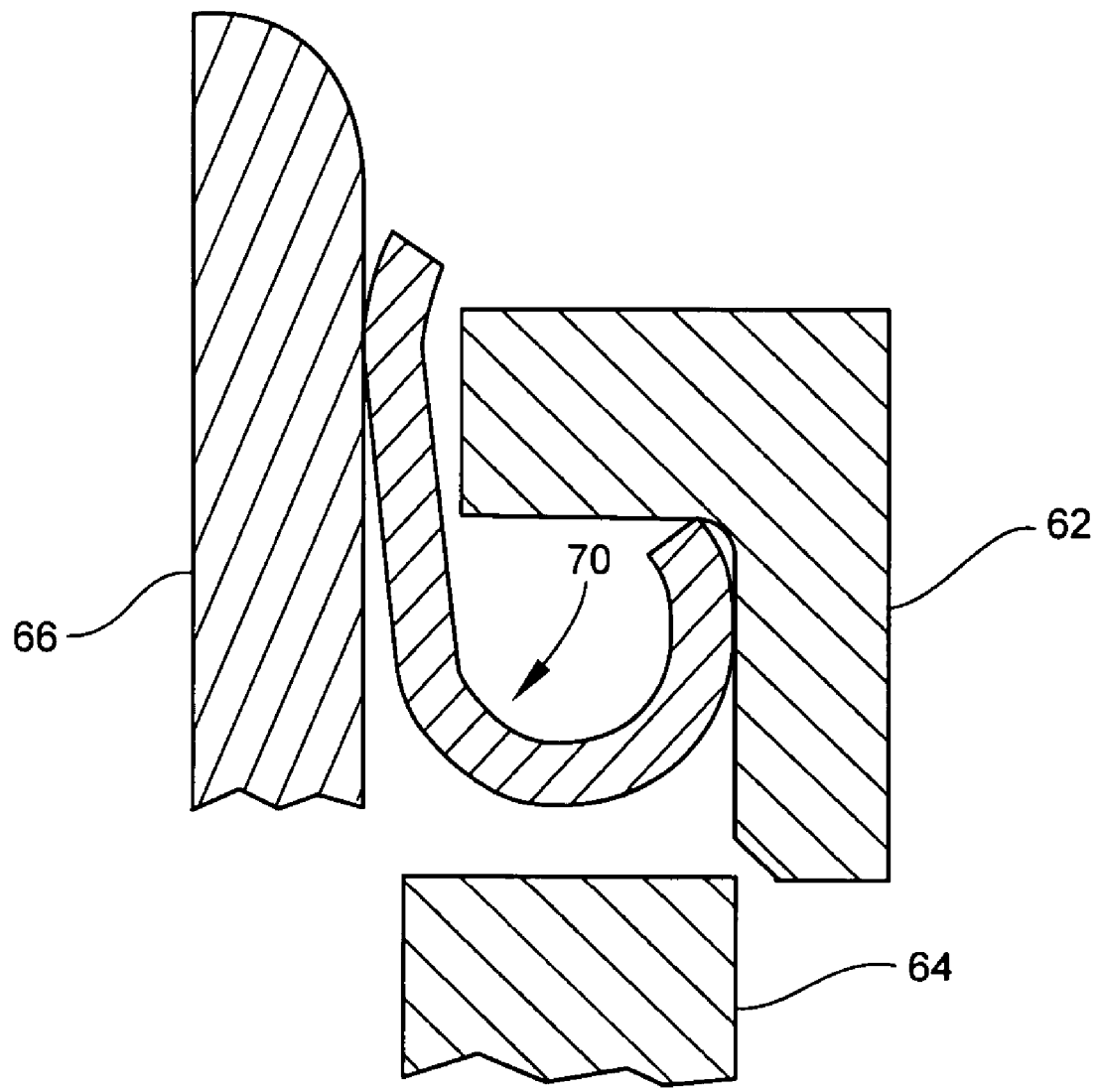
FIG. 6 is a schematic cross-sectional view of installed seal of the present invention with the axis of the probe displaced to the left.

Referring to FIG. 4, there is illustrated the installation of a seal of the present invention showing the insertion of the aforesaid seal in the body of a coupling. Seal 60 is installed in body 62 of a coupling, with retaining wall 64 positioned adjacent the seal and probe 66 spaced from the seal. Referring to FIG. 5, there is shown seal 70 in accordance with another embodiment of the present invention. Seal 70 comprises an outward curved portion 72 and frustro-conical portion 74. The seal 70 is installed in an interference relationship with body 62 and axial retaining wall 64, with probe 66 inserted in contacting, interfering relationship with the seal adjacent to the frustro-conical portion 74. Elastic deflection of the seal inner lip and tapered frustro-conical portion 74 permits lateral offset of the probe without leakage. The axis of probe 66 is displaced to the right vis-à-vis body 62. Referring to FIG. 6, there is shown a relationship similar to that shown in FIG. 5. However, the axis of the probe is displaced to the left vis-à-vis body 62, widening the gap between body 62 and the frustro-conical portion 74.

Figure 7:
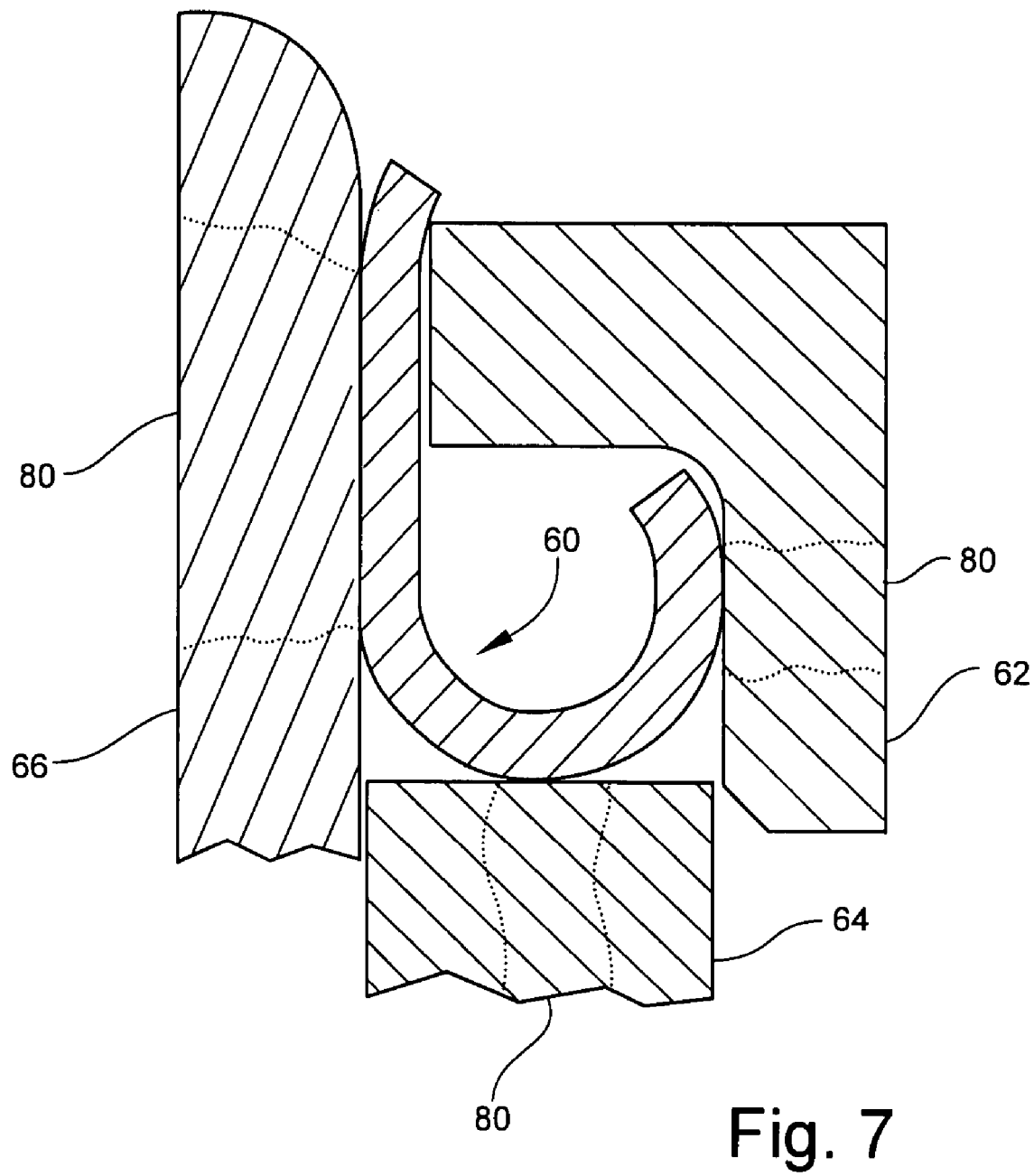
FIG. 7 is a schematic cross-sectional view of an installed seal of the present invention at operating pressure.

FIG. 7 is a view of an installed seal, similar to the view shown in FIG. 5. However, FIG. 7 shows seal 60 at exemplicative high operating pressure of 30,000 psi deflecting the walls of the seal wherein the seal 60 is not completely deformed. The darker areas 80 on the body 62, retaining wall 64 and probe 66 show higher stress contact regions.

Figure 8:
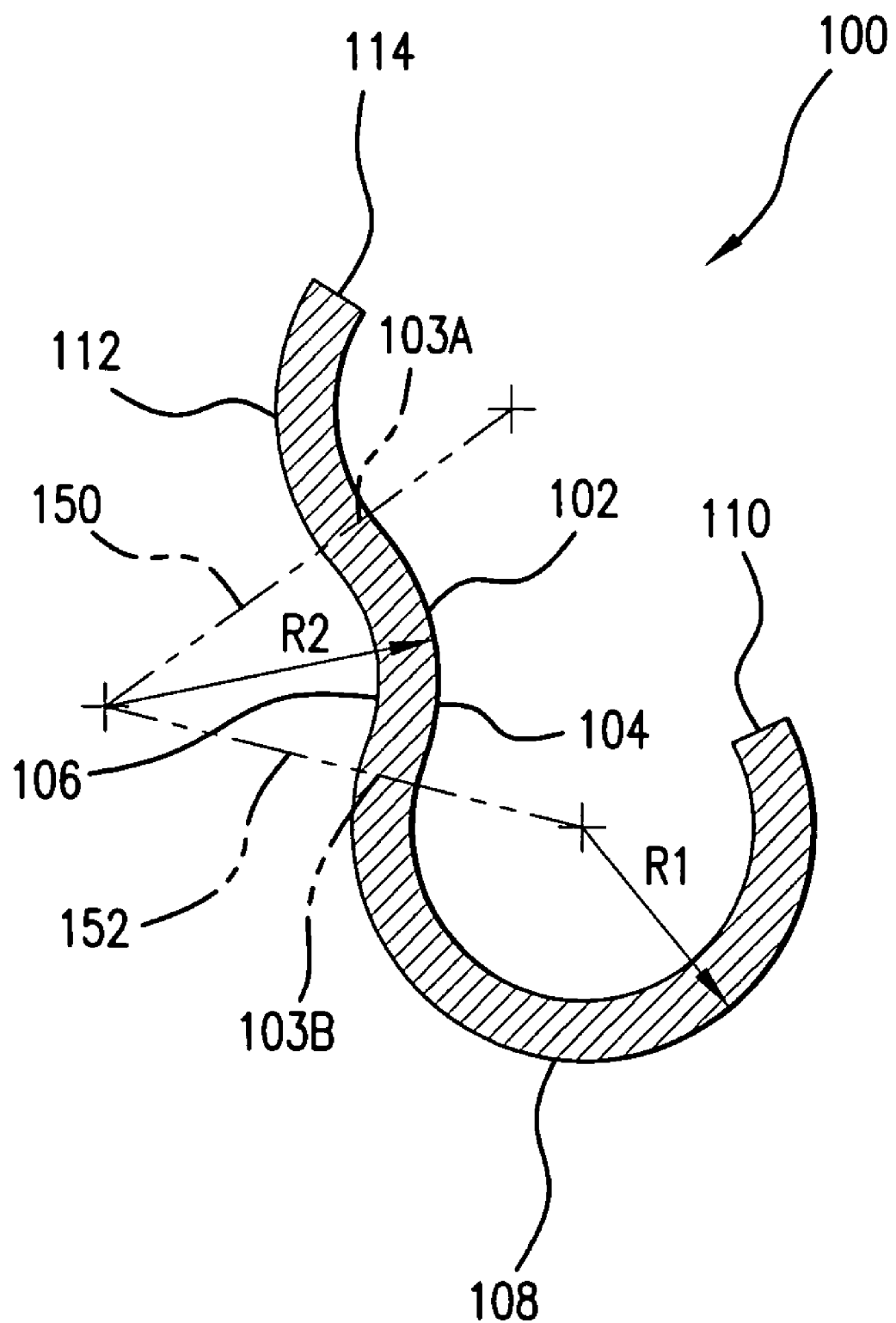
FIG. 8 is a cross-sectional view of an annular axial seal in accordance with another embodiment of the present invention.

Naturally, variations in the seal are contemplated. For example, the longitudinally extending portion could be conical or have a slight curve. The c-shaped portion could have variations and flats and need not be uniform. All shapes could be slightly irregular. FIG. 8 shows seal 100 in accordance with a further embodiment of the invention. Seal 100 comprises curved central section 102 which has opposite ends 103A and 103B. Central section 102 has a first side 104 and an opposite, second side 106. Seal 100 further comprises curled section 108 that is contiguous with end 103B of curved central section 102. Curled section 108 curls in a first direction in accordance with a predetermined radius R1 and a predetermined distance such that distal end 110 is located directly across from side 104 of curved central section 102. Seal 100 further comprises end portion 112 that is contiguous with end 103A of curved central section 102 such that curved central section 102 is between end portion 112 and curled section 108. End portion 112 has end 114 that does not directly face distal end 110 of curled section 108. Curved central section 102 is inwardly curved thereby providing seal 100 with a generally sinuous or serpentine shape. Dashed reference lines 150 and 152 define the boundaries of curved central section 102. Reference line 150 is superimposed over end 103A. Similarly, reference line 152 is superimposed over end 103B. The curved central section 102 curves in accordance with a predetermined tangential radius R2 as shown in FIG. 8. In a preferred embodiment, the ratio R2/R1 is greater than or equal to 1:1. The reasons for this preferred ratio is discussed in the ensuing discussion. The overall shape of annular, axial seal 100 is generally frustro-conical.

The generally inwardly curved shape of central section 102 provides several advantages. Specifically, the increased stiffness provided by the generally serpentine or sinuous shape provides an increase in load that is necessary for sealing gases, as opposed to sealing more viscous fluids such as oil, without increasing stresses. This is contrary to prior art techniques that increase material thickness of the seal in order to increase stiffness, but which also causes an increase of deflection stresses. Another advantage of the generally serpentine or sinuous shape of seal 100 is that it provides a longer sealing contact arc which increases the axial contact length when a soft, deformable coating is applied to seal 100. This is also advantageous in particular for gas sealing applications. The preferred limitation of the radius R2 preserves the robustness of central section 102, eliminates the probability of cracking when high system pressure inside of the cross-section of seal 100 tends to increase the radius R2, and reduces any change in the axial distance between the inner and outer sealing contact lines under these conditions. Thus, in order to achieve these particular advantages, it is preferred that the ratio R2/R1 be greater than or equal to 1:1.

Figure 9:
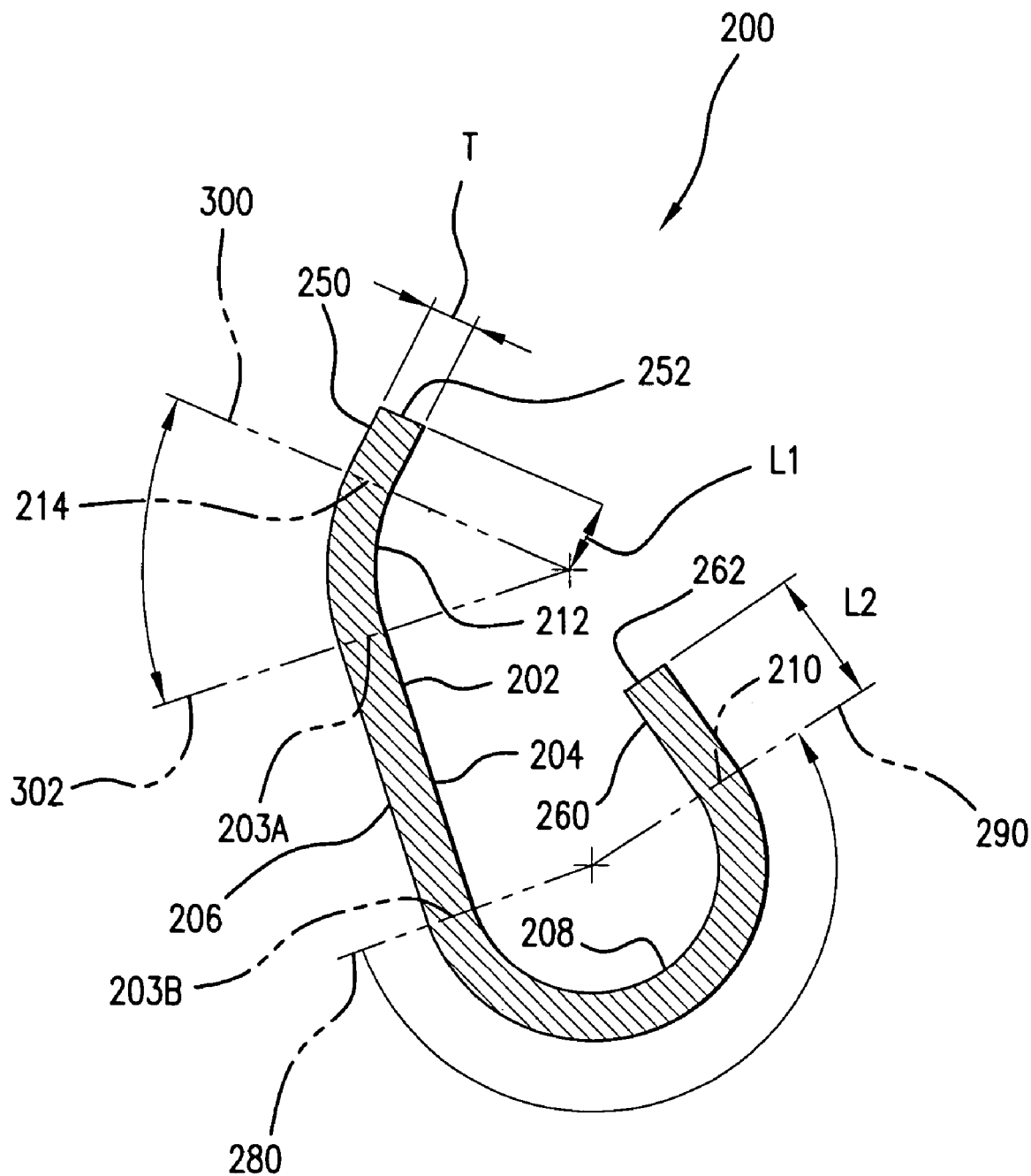
FIG. 9 is a cross-sectional view of an annular axial seal in accordance with a further embodiment of the present invention.

Referring to FIG. 9, there is shown annular, axial seal 200 in accordance with a further embodiment of the present invention. Seal 200 comprises linear section 202 which has opposite ends 203A and 203B. Linear section 202 has a first side 204 and a second opposite side 206. First side 204 lies in first plane and second side 206 lies in a second plane that is parallel to the first plane in which first side 204 lies. Seal 200 further comprises curled section 208 that is contiguous with end 203B of linear section 202. Curled section 208 curls in a first direction in accordance with a predetermined radius and predetermined distance. Curled section 208 has an end 210. Linear section 202 and curled section 208 provide a generally "J" shaped cross-section. Reference line 280 indicates the beginning of an arc that defines curled section 208, and reference line 290 indicates the end of this arc. Thus, in FIG. 9, reference line 280 is superimposed over end 203B of linear section 202, and reference line 290 is superimposed over end 210 of curled section 208.

Seal 200 further comprises end portion 212 that is contiguous with end 203A of linear section 202 such that linear section 202 is between end portion 212 and curled section 208. End portion 212 has end 214. End portion 212 is slightly curved with respect to linear section 202 such that end portion 212 breaks the plane in which lies side 204 of linear section 202. Reference lines 300 and 302 define an arcuate section which defines the boundaries of end portion 212. Thus, in FIG. 9, reference line 300 is superimposed over end 214 of end portion 212, and reference line 302 is superimposed over end 203A of linear section 202.

The overall shape of annular, axial seal 200 is generally frustro-conical. Seal 200 has a material thickness T that is uniform throughout the cross-section thereof. In accordance with this embodiment of the invention, annular, axial seal 200 has extended tip portion 250 which is contiguous with end 214 of end portion 212. Extended tip portion 250 has end 252 and a length L1. In a preferred embodiment, the length L1 does not exceed a length that is equal to three times the material thickness T (i.e. $L1 \leq 3T$).

Referring to FIG. 9, annular axial seal 200 further includes extended portion 260 that is contiguous with end 210 of curled portion 208. Extended portion 260 has an end 262. The radius of the curvature of curled portion 208 results in end 262 being located across from side 204 of linear section 202. Extended portion 260 has a length L2. In a preferred embodiment, length L2 does not exceed a length that is equal to twice the material thickness T (i.e., $L2 \leq 2T$).

Figure 2D:
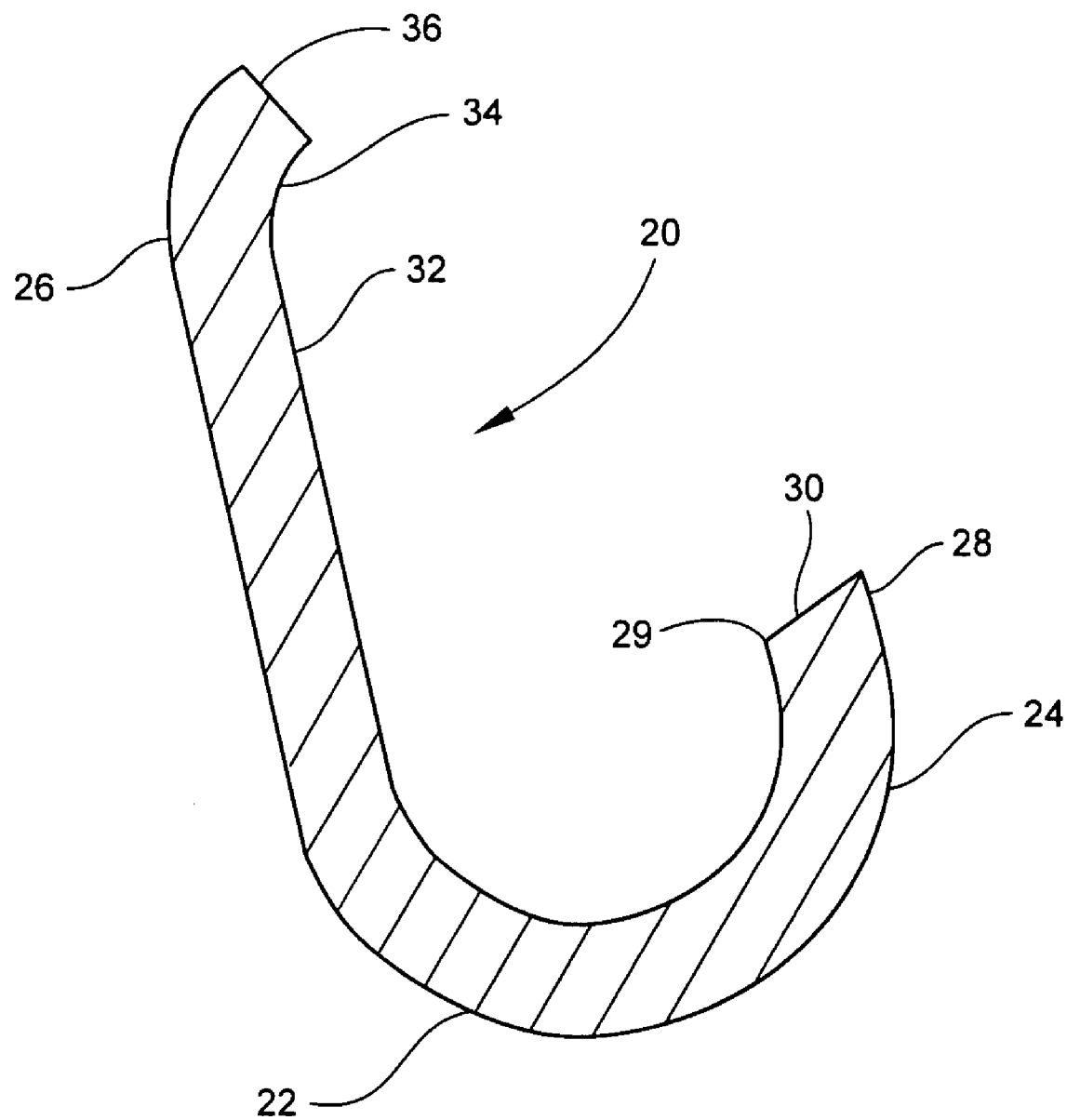
FIG. 2D is a cross-sectional view of the seal of the present invention.
Figure 2E:
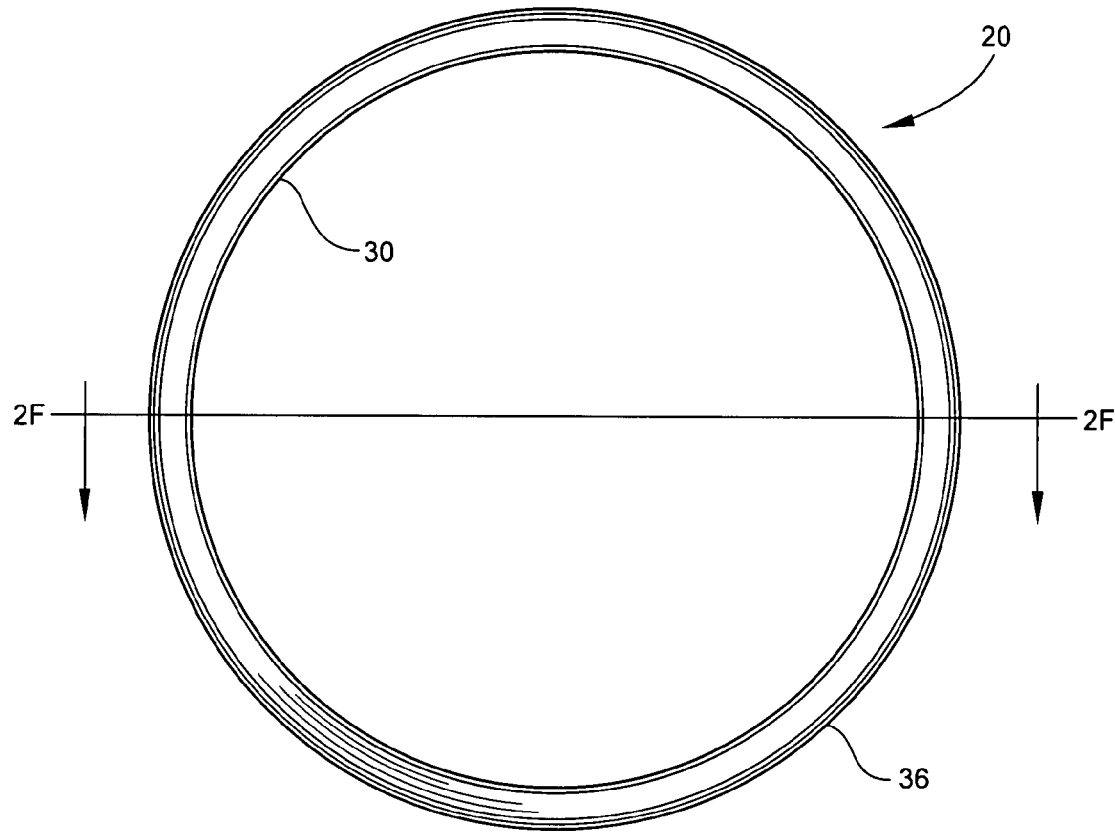
FIG. 2E is another plan view of the seal of the present invention.
Figure 2F:
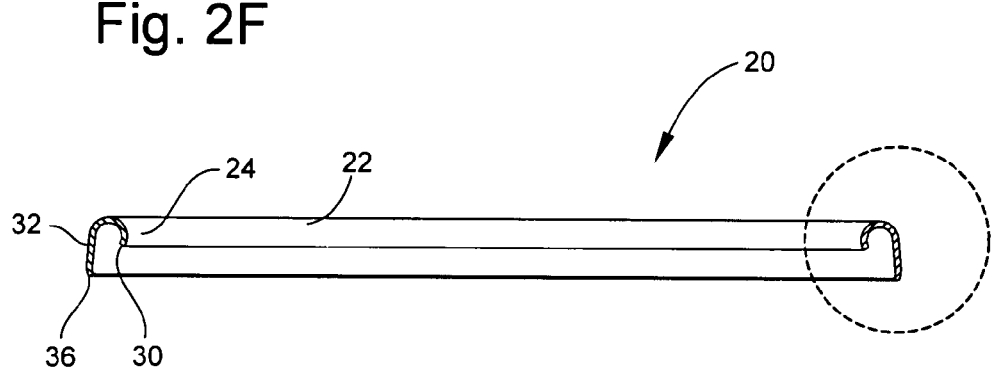
FIG. 2F is a side view, in longitudinal section, taken along line 2F-2F in FIG. 2E.
Figure 2G:
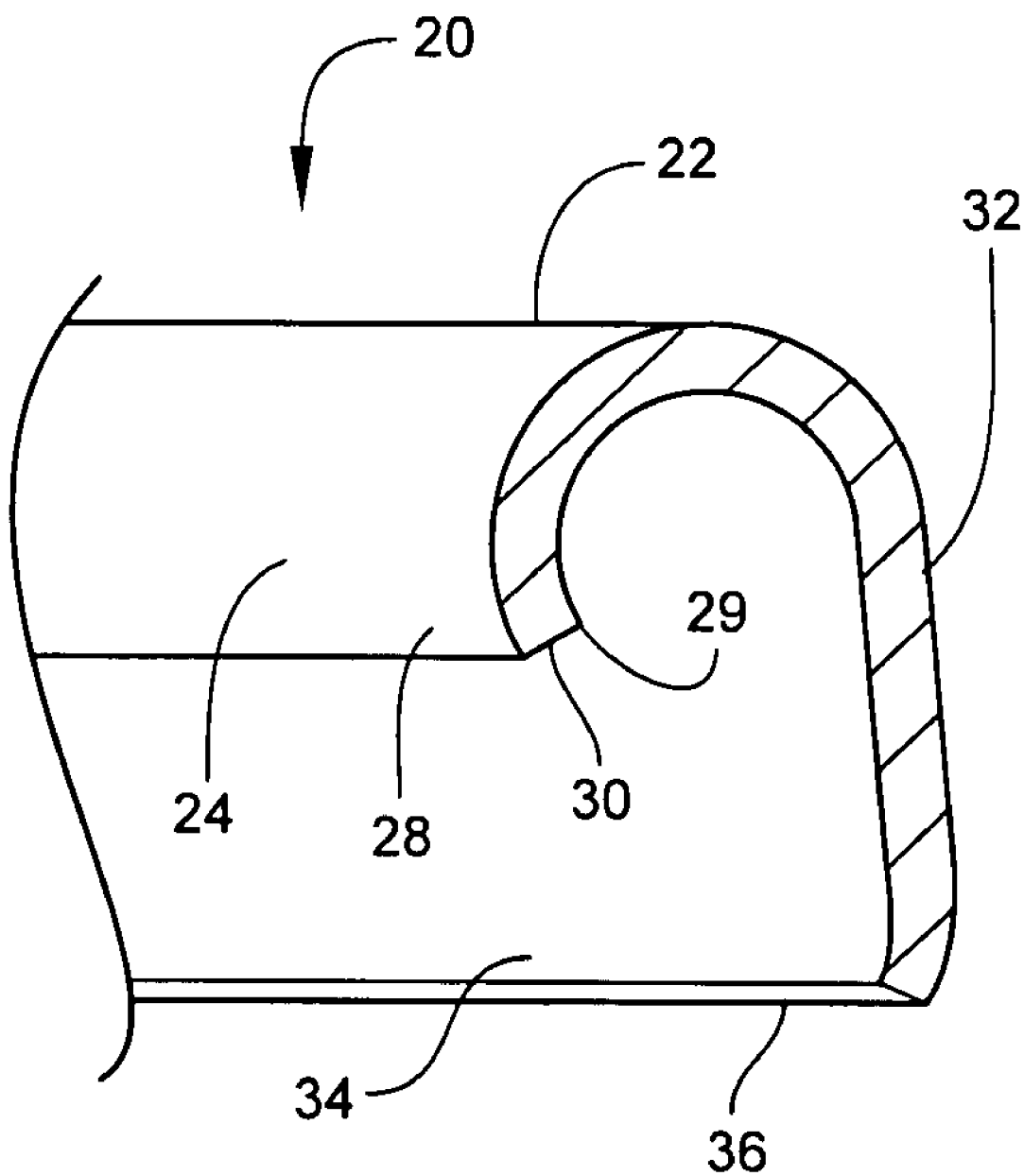
FIG. 2G is an enlarged view of a portion of the view shown in FIG. 2F.

When comparing seal 200 to seal 20 shown in FIG. 2D, extending tip portion 250 and extended end portion 260 are tangential to the radii at each end of seal 20.

Seal 200 provides several advantages for certain applications. For example, extended tip portion 250 and extended end 260 provide seal 200 with a small increase in stiffness without the necessity of increasing the material thickness T. Furthermore, it may be desirable to have either extended tip portion 250 or extended end 260 lie in close proximity to a gland (cavity) feature, in order to better position seal 200 in axial relation to the mating gland surface with which the other sealing diameter engages. Additionally, extended tip portion 250 and extended end 260 allows for wider tolerances on lengths without varying the critical distance between inner and outer sealing lines.

In an alternate embodiment, extended tip portion 250 is slightly curved to the inside of seal 200, but ends 252 and 262 do not directly face each other. In a further embodiment, extended tip portion 250 is slightly curved to the outside.

In an alternate embodiment, extended portion 260 slightly curves inward toward side 204 of linear section 202. In a further embodiment, extended portion 260 slightly curves outward, away from side 204 of linear section.

Figure 10:
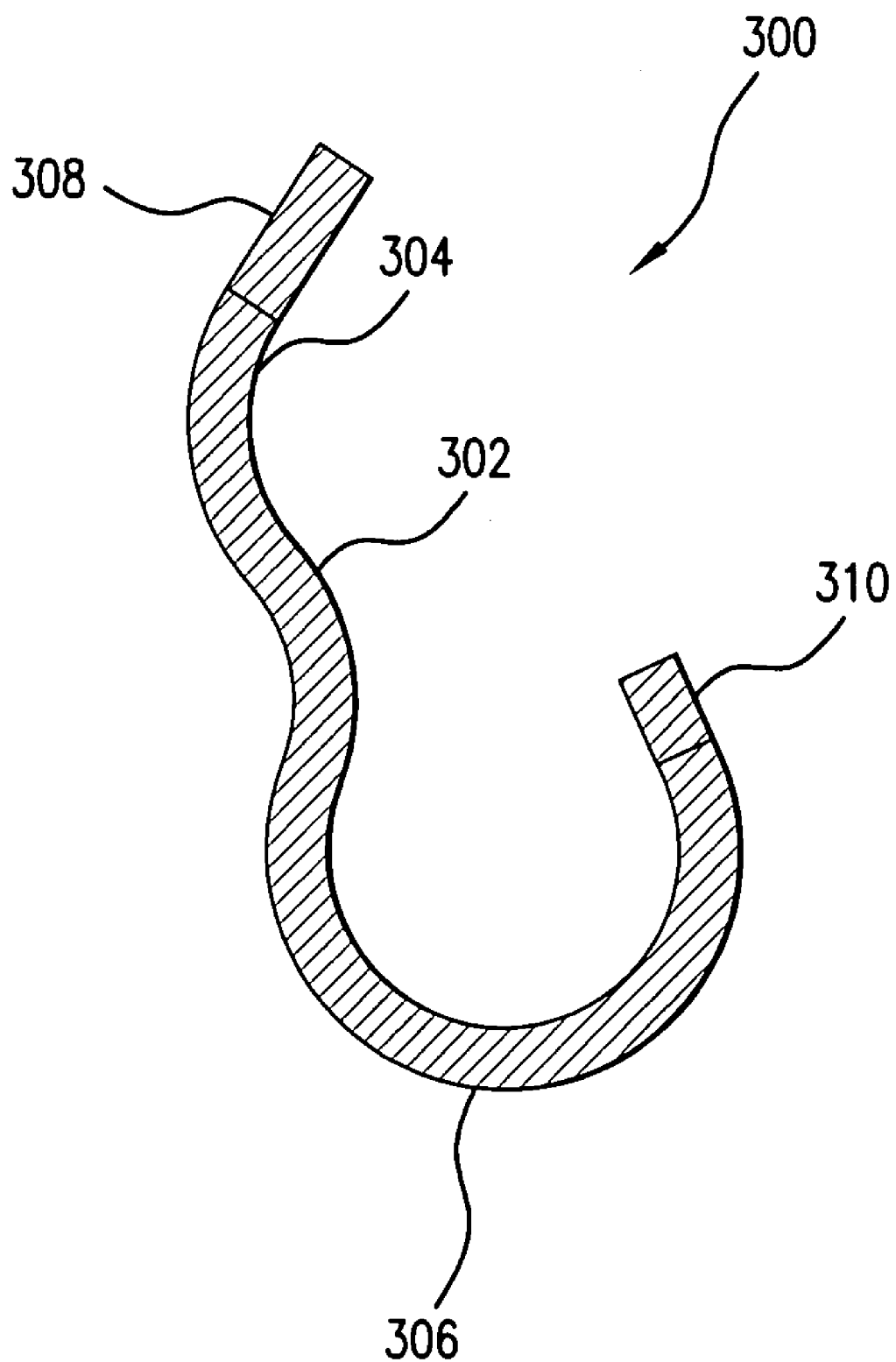
FIG. 10 is a cross-sectional view of an annular axial seal in accordance with yet another embodiment of the present invention.

Referring to FIG. 10, there is shown an annular axial seal 300 in accordance with a further embodiment of the present invention. Seal 300 combines the features of seals 100 and 200. Specifically, seal 300 comprises curved central section 302, end portion 304 which is contiguous with curved central section 302, and curled section 306 which is contiguous with curved central section 302. Seal 300 further includes extending tip portion 308 which is contiguous with and extends from end portion 304, and extending end portion 310 which is contiguous with and extends from curled section 306.

Various coatings, including silver or gold, may be beneficially applied to the seal or its contact surfaces in order to improve its sealing efficiency. For dynamic applications, special anti-galling, low-friction coatings may be applied. Thus, sealing contact areas may be coated with soft, lubricious and/or anti-galling materials.

It is to be understood that the invention is not limited to the illustrations described and shown herein, which are deemed to be merely illustrative of the best modes of carrying out the invention, and which are susceptible of modification of form, size, and arrangement of parts and details of operation. Rather, the invention is intended to encompass all such modifications which are within the spirit and scope as defined by the claims.

What is claimed is:

1. An annular, axial seal consisting of:
   a central section having of opposite ends, a first side and an opposite second side, said central section having a slight curve therein in accordance with a first, predetermined radius;
   a curled section contiguous with one of said ends of said central section, said curled section curling in a first direction to a distal end, said curled section curling in said first direction in accordance with a second predetermined radius and predetermined distance such that said distal end of said curled section is located across from said first side of said central section;
   wherein the ratio of said first, predetermined radius to said second, predetermined radius is greater than or equal to 1:1;
   an end portion contiguous with said opposite end of said central section such that said central section is between said end portion and said curled section, said end portion slightly curving in said first direction and having an end that does not directly face said distal end of said curled section; and
   said annular axial seal having a substantially uniform material thickness throughout the cross-section of said annular axial seal.

* * * * *

UNITED STATES PATENT AND TRADEMARK OFFICE
CERTIFICATE OF CORRECTION

| | | |
|---|---|---|
| PATENT NO. | : 7,789,397 B2 | Page 1 of 1 |
| APPLICATION NO. | : 11/784716 | |
| DATED | : September 7, 2010 | |
| INVENTOR(S) | : Horace Halling | |

It is certified that error appears in the above-identified patent and that said Letters Patent is hereby corrected as shown below:

In claim 1, line 2, after the word "having", please delete the word "of".

Signed and Sealed this
Twenty-ninth Day of November, 2011

David J. Kappos
*Director of the United States Patent and Trademark Office*

UNITED STATES PATENT AND TRADEMARK OFFICE
CERTIFICATE OF CORRECTION

PATENT NO. : 7,789,397 B2  Page 1 of 1
APPLICATION NO. : 11/784716
DATED : September 7, 2010
INVENTOR(S) : Horace Halling It is certified that error appears in the above-identified patent and that said Letters Patent is hereby corrected as shown below:

Column 8, line 6 (claim 1, line 2) after the word "having", please delete the word "of".

This certificate supersedes the Certificate of Correction issued November 29, 2011.

Signed and Sealed this
Third Day of January, 2012

David J. Kappos
*Director of the United States Patent and Trademark Office*